United States Patent
Shariff et al.

(10) Patent No.: US 12,260,883 B1
(45) Date of Patent: Mar. 25, 2025

(54) SYSTEM AND METHOD TO ENHANCE AUDIO AND VIDEO MEDIA USING GENERATIVE ARTIFICIAL INTELLIGENCE

(71) Applicant: Morgan Stanley Services Group Inc., New York, NY (US)

(72) Inventors: Faisal Shariff, Middlesex (GB); Richard Marsh, Warwickshire (GB); Chandrakanta Rana, Ontario (CA); Salvatore Restivo, Port Washington, NY (US); Aniroodh Suddhapalli, Telangana (IN); Prashant Jha, Maharashtra (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/808,386

(22) Filed: Aug. 19, 2024

(51) Int. Cl.
G11B 27/34 (2006.01)
G06F 3/0484 (2022.01)
G06F 40/166 (2020.01)
G06F 40/58 (2020.01)

(52) U.S. Cl.
CPC ............ *G11B 27/34* (2013.01); *G06F 3/0484* (2013.01); *G06F 40/166* (2020.01); *G06F 40/58* (2020.01)

(58) Field of Classification Search
None
See application file for complete search history.

(56) References Cited

U.S. PATENT DOCUMENTS

| | | | |
|---|---|---|---|
| 7,181,757 B1 * | 2/2007 | Kim | G11B 27/105 725/40 |
| 10,460,178 B1 | 10/2019 | Fieldman | |
| 10,635,754 B1 * | 4/2020 | Pham | G06F 40/51 |
| 10,685,059 B2 * | 6/2020 | Kim | G06F 16/739 |
| 10,970,494 B2 * | 4/2021 | Pham | G06F 40/274 |
| 11,372,852 B2 | 6/2022 | Raman et al. | |
| 2010/0141655 A1 * | 6/2010 | Belinsky | G11B 27/10 345/440 |
| 2013/0304453 A9 * | 11/2013 | Fritsch | G06F 40/30 704/E15.044 |
| 2021/0034823 A1 * | 2/2021 | Pham | G06F 40/274 |
| 2023/0223016 A1 | 7/2023 | Konam et al. | |
| 2023/0274481 A1 | 8/2023 | Gutman et al. | |
| 2023/0281248 A1 | 9/2023 | Schalkwyk et al. | |
| 2024/0281594 A1 * | 8/2024 | Rao | G06F 40/166 |
| 2024/0281596 A1 * | 8/2024 | Rao | G06F 40/169 |

* cited by examiner

*Primary Examiner* — Maikhanh Nguyen
(74) *Attorney, Agent, or Firm* — Leason Ellis LLP

(57) ABSTRACT

A system and method enhance original media including a first audio using generative artificial intelligence, including large language models and media conversion modules. The system includes a graphic user interface (GUI) including a media player and a display region for outputting an enhanced media including the original media, a summary of the original media, and the plurality of chapter headings of the original media. The media player plays the original media, and the display region displays the summary and the plurality of chapter headings. The summary, the plurality of chapter headings, and each of a translation into a selected language and a second audio generated from the summary and the plurality of chapter headings are automatically generated from the original media. The method implements the system.

17 Claims, 11 Drawing Sheets

SYSTEM AND METHOD TO ENHANCE AUDIO AND VIDEO MEDIA USING GENERATIVE ARTIFICIAL INTELLIGENCE

FIELD OF THE DISCLOSURE

The present disclosure relates generally to audio and video media, and, more particularly, to a system and method to enhance audio and video media using generative artificial intelligence.

BACKGROUND OF THE DISCLOSURE

Supplementing audio or video media with supplemental information is known, such as captioning, providing a summary of the media content, and providing chapter breaks. A common method of supplementing media is to manually input such supplemental information to be associated with the supplemented media. For example, as shown in FIG. 1, a system 100 in the prior art allows audio or video media 102 and supplemental information 104 to be provided to an audio/video media platform 106. In one implementation, the supplemental information 104 includes a summary of the content of the audio or video media 102. In another implementation, the supplemental information 104 incudes chapter break, and text associated with each chapter.

One example of such an audio/video media platform 106 is YOUTUBE, an online media sharing platform publicly available from GOOGLE LLC. In particular, known audio/video media platforms 106 such as YOUTUBE require such supplemental information 104 to be input manually by a user through a manual input device 108. For example, the manual input device 108 is a keyboard or other manual controls. Through the manual input device 108, the user inputs such supplemental information 104 as text, and the user inputs commands to the audio/video media platform 106 to associate or merge the supplemental information 104 with the audio/video media 102 to generate and output an annotated audio/video media 110. In one implementation, the audio/video media platform 106 hosts the annotated audio/video media 110, allowing others to view the annotated audio/video media 110 including the supplemental information 104.

However, by being dependent on manual annotation, an audio/video media platform 106 cannot efficiently incorporate large amounts of supplemental content, and cannot readily provide language translation and transcript follow-along capabilities.

SUMMARY OF THE DISCLOSURE

According to an implementation consistent with the present disclosure, a system and method enhance audio and video media using generative artificial intelligence.

In an implementation, a system comprises a media source and a media enhancement system. The media source is configured to provide an original media including first audio. The media enhancement system includes a hardware-based processor, a memory, an input/output device, and a set of modules. The memory is configured to store instructions and is configured to provide the instructions to the hardware-based processor. The input/output device is configured to display a graphic user interface (GUI) with a media player. The set of modules is configured to implement the instructions provided to the hardware-based processor. The set of modules includes a transcoding media-to-text module, a summarizing module, and a chapterizing module. The transcoding media-to-text module, including a first media conversion module, is configured to automatically generate text corresponding to the audio. The summarizing module, including a first large language model, is configured to automatically generate a summary of the generated text. The chapterizing module, including a second large language model, is configured to automatically generate a plurality of chapter headings with each chapter heading corresponding to a respective portion of the generated text. The GUI outputs an enhanced media including the original media, the summary, and the plurality of chapter headings, with the media player configured to play the original media to a user. The GUI includes a display region displaying the summary and the plurality of chapter headings to the user.

The original media can include video incorporating the audio. The original media can be in a first language. The transcoding media-to-text module can be configured to generate the generated text in the first language. The input/output device can receive a selection of a second language from the user. The set of modules can include a translating module, including a third large language model, configured to automatically convert the generated text in the first language to a translated text in the second language. The summarizing module can be configured to automatically generate a summary of the translated text. The chapterizing module can be configured to automatically generate a plurality of chapter headings of the translated text.

Each of the summarizing module, the chapterizing module, and the translating module can include a neural network configured as a transformer to implement the first, second, and third large language models, respectively. The set of modules can include a transcoding text-to-audio module, including a second media conversion module, configured to automatically generate a second audio from the generated text. Each of transcoding media-to-text module and the transcoding text-to-audio module can include a natural language processing module configured to perform natural language processing on the original media and on the generated text, respectively, to implement the first and second media conversion modules, respectively. The GUI can include a control, responsive to a user selection, and configured to control the media player to play the original media to the user, to control the displaying of the summary to the user, or to control the display of the plurality of chapter headings to the user.

In another implementation, a media enhancement system, responsive to an original media including first audio, comprises a hardware-based processor, a memory, an input/output device, and a set of modules. The memory is configured to store instructions and is configured to provide the instructions to the hardware-based processor. The input/output device is configured to display a graphic user interface (GUI) with a media player. The set of modules is configured to implement the instructions provided to the hardware-based processor. The set of modules includes a transcoding media-to-text module, a summarizing module, and a chapterizing module. The transcoding media-to-text module, including a first media conversion module, is configured to automatically generate text corresponding to the audio. The summarizing module, including a first large language model, is configured to automatically generate a summary of the generated text. The chapterizing module, including a second large language model, is configured to automatically generate a plurality of chapter headings with each chapter heading corresponding to a respective portion of the generated text. The GUI outputs an enhanced media including the original media, the summary, and the plurality of chapter headings, with the media player configured to play the original media to a user. The GUI includes a display region displaying the summary and the plurality of chapter headings to the user.

The original media can include video incorporating the audio. The original media can be in a first language. The transcoding media-to-text module can be configured to generate the generated text in the first language. The input/output device can receive a selection of a second language from the user. The set of modules can include a translating module, including a third large language model, configured to automatically convert the generated text in the first language to a translated text in the second language. The summarizing module can be configured to automatically generate a summary of the translated text. The chapterizing module can be configured to automatically generate a plurality of chapter headings of the translated text.

Each of the summarizing module, the chapterizing module, and the translating module can include a neural network configured as a transformer to implement the first, second, and third large language models, respectively. The set of modules can include a transcoding text-to-audio module, including a second media conversion module, configured to automatically generate a second audio from the generated text. Each of transcoding media-to-text module and the transcoding text-to-audio module can include a natural language processing module configured to perform natural language processing on the original media and on the generated text, respectively, to implement the first and second media conversion modules, respectively. The GUI can include a control, responsive to a user selection, and configured to control the media player to play the original media to the user, to control the displaying of the summary to the user, or to control the display of the plurality of chapter headings to the user.

In a further implementation, a computer-based method comprises receiving an original media including audio, displaying a graphic user interface (GUI) with a media player and a display region on an input/output device, automatically transcoding the audio of the original media into text using a transcoding media-to-text module including a first media conversion module, automatically summarizing the text in a first language into a summary using a summarizing module including a first large language model, automatically chapterizing the text in the first language into a plurality of chapter headings using a chapterizing module including a second large language model, outputting through the GUI an enhanced media including the original media, the summary, and the plurality of chapter headings, with the media player configured to play the original media to a user, and displaying through the GUI the summary and the plurality of chapter headings in the display region to the user.

The original media can include video incorporating the audio. The computer-based method can further comprise providing a translating module, including a third large language model, wherein the original media is in a first language, wherein the transcoding media-to-text module is configured to generate the generated text in the first language, and wherein the input/output device receives a selection of a second language from the user. The computer-based method can further comprise automatically converting the generated text in the first language to a translated text in the second language using the translating module, automatically generating a summary of the translated text using the summarizing module, and automatically generating a plurality of chapter headings of the translated text using the chapterizing module.

Each of the summarizing module, the chapterizing module, and the translating module can include a neural network configured as a transformer to implement the first, second, and third large language models, respectively. The computer-based method can further comprise providing a transcoding text-to-audio module, including a second media conversion module, and automatically generating a second audio from the generated text. Each of transcoding media-to-text module and the transcoding text-to-audio module can include a natural language processing module configured to perform natural language processing on the original media and on the generated text, respectively, to implement the first and second media conversion modules, respectively.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 200 and method 1000 to enhance audio and video media using generative artificial intelligence (AI).

Figure 1:
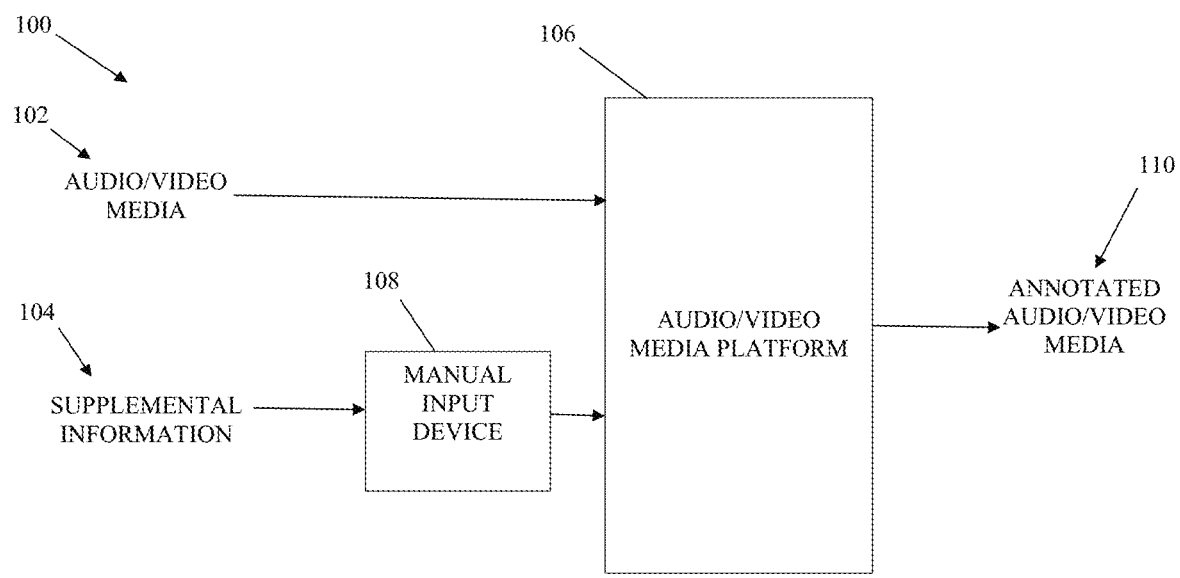
FIG. 1 is a schematic of an audio/video annotation system in the prior art.
Figure 2:
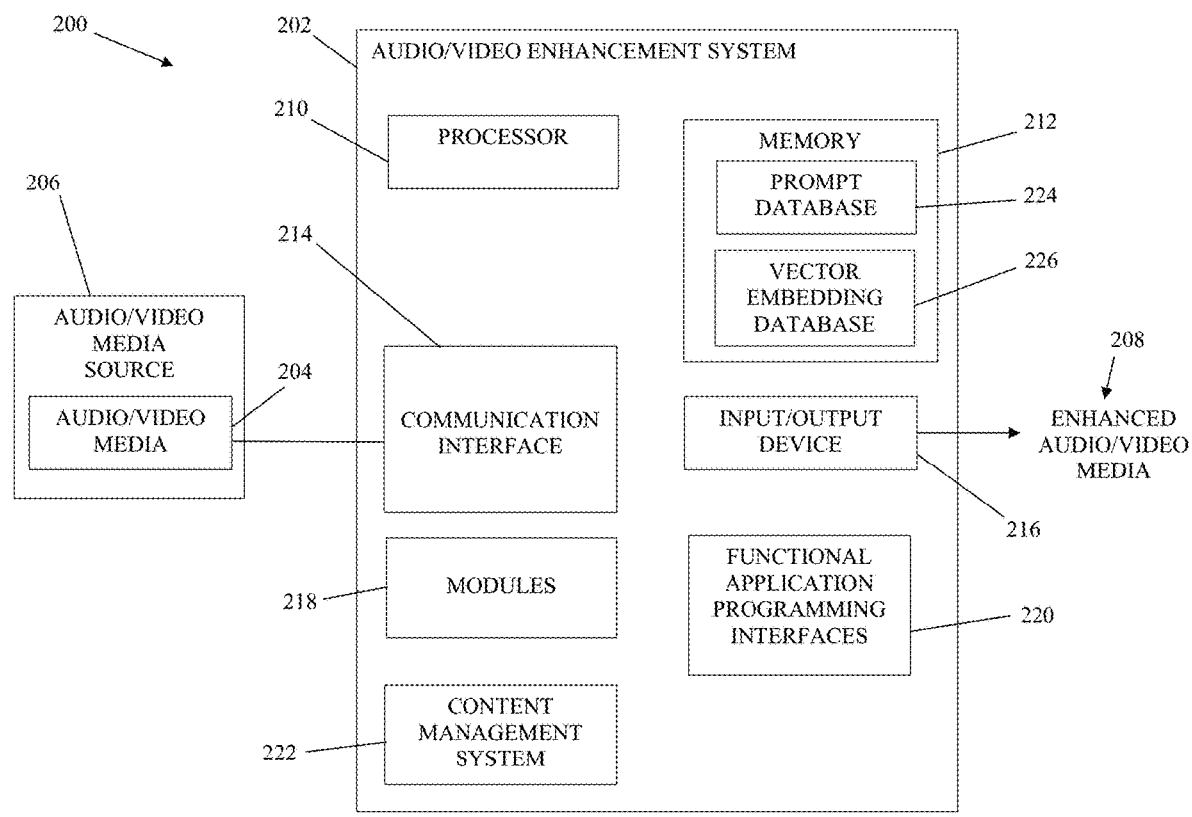
FIG. 2 is a schematic of a system, according to an implementation.

In an implementation consistent with the invention, referring to FIG. 2, the system 200 includes an audio/video (AV or A/V) enhancement system 202 configured to receive audio/video media 204, and to automatically generate and output enhanced audio/video media 208 from the audio/video media 204 without supplemental information and without manual inputting of any supplemental information. The audio/video enhancement system 202 is operatively connected to an audio/video media source 206 which provides the audio/video media 204. The audio/video media 204 includes audio, podcasts, video, animation, still images, and other audible and visual data in any known format configured to convey information to a user. In one implementation, the audio/video media 204 is media content generated by research activities of an organization, with such content relevant to one or more topics of interest to users associated with the organization. For example, the users are salespeople of the organization employing audio or video to market products or services of the organization. In another example, the users are investors or clients of the organization, with the investors or clients interested in further information of investment opportunities provided by the organization.

In one implementation, the audio/video media 204 is curated during such research activities. In another example, the audio/video media 204 includes content collected from other data sources, such as written investment analysis, earnings model spreadsheets, investor presentations, reliable data sources, news organizations, historical or scientific publications, encyclopedias, dictionaries, and other data relevant to one or more audio or video media.

In one implementation, the audio/video enhancement system 202 is operatively connected to the audio/video media source 206 through a network. For example, the network is the Internet. In another example, the network is an internal network or intranet of an organization. In a further example, the network is a heterogeneous or hybrid network including the Internet and the intranet.

In one implementation, the audio/video enhancement system 202 pulls the audio/video media 204 from the audio/video media source 206; for example, when a user accesses, searches for, or requests a particular audio or video by a topic, a title, a keyword, or a phrase. In another implementation, the audio/video media source 206 pushes a particular audio or video as the audio video media 206 to the audio/video enhancement system 202, such as during a livestream presentation.

In an implementation consistent with the invention, the audio/video enhancement system 202 includes a hardware-based processor 210, a memory 212 configured to store instructions and configured to provide the instructions to the hardware-based processor 210, a communication interface 214 configured to receive the audio/video media 204, an input device 216, and a set of modules 218 configured to implement the instructions provided to the hardware-based processor 210. In one implementation, the input/output device 216 includes an audio speaker, a keyboard, a mouse, and a display or monitor configured to display a graphic user interface (GUI) using a web browser to output the enhanced audio/video media 208 to a user. In another implementation, the audio/video enhancement system 202 further includes functional application programming interfaces (APIs) 220 and a content management system (CMS) 222, as described in greater detail below. In an implementation, the content management system 222 is computer software used to manage the creation and modification of digital content. For example, the content management system 222 includes ADOBE EXPERIENCE MANAGER (AEM) publicly available from ADOBE INC. In another example, the content management system 222 includes WORDPRESS publicly available from WORDPRESS FOUNDATION, JOOMLA publicly available from OPEN SOURCE MATTERS, INC., SHOPIFY publicly available from SHOPIFY INC., or WIX publicly available from WIX.COM LTD. In a further example, the content management system 222 includes any known system and method configured to manage the creation and modification of digital content.

In an implementation, the memory 212 further stores a prompt database 224 configured to store prompts used in a generative AI module or application. The memory 212 also stores a vector embedding database 226 configured to store embedding vectors used in a large language model, as described in greater detail below.

Figure 3:
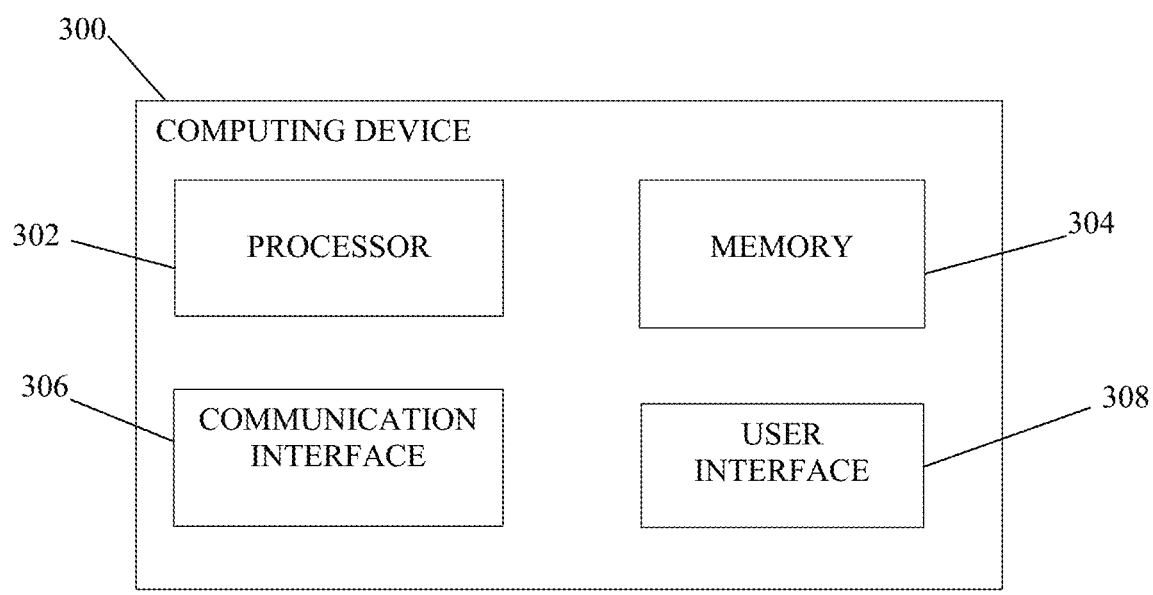
FIG. 3 is a schematic of a computing device used in the implementation of FIG. 2.

FIG. 3 illustrates a schematic of a computing device 300 including a processor 302 having code therein, a memory 304, and a communication interface 306. Optionally, the computing device 300 can include a user interface 308, such as an input device, an output device, or an input/output device. The processor 302, the memory 304, the communication interface 306, and the user interface 308 are operatively connected to each other via any known connections, such as a system bus, a network, etc. Any component, combination of components, and modules of the system 200 in FIG. 2 can be implemented by a respective computing device 300. For example, each of the components 202, 210, and 212-226 shown in FIG. 2 can be implemented by a respective computing device 300 shown in FIG. 3 and described below.

It is to be understood that the computing device 300 can include different components. Alternatively, the computing device 300 can include additional components. In another alternative implementation, some or all of the functions of a given component can instead be carried out by one or more different components. The computing device 300 can be implemented by a virtual computing device. Alternatively, the computing device 300 can be implemented by one or more computing resources in a cloud computing environment. Additionally, the computing device 300 can be implemented by a plurality of any known computing devices.

The processor 302 can be a hardware-based processor implementing a system, a sub-system, or a module. The processor 302 can include one or more general-purpose processors. Alternatively, the processor 302 can include one or more special-purpose processors. The processor 302 can be integrated in whole or in part with the memory 304, the communication interface 306, and the user interface 308. In another alternative implementation, the processor 302 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 302 can include a plurality of processing elements configured to perform parallel processing. In a further alternative implementation, the processor 302 can include a plurality of nodes or artificial neurons configured as an artificial neural network. The processor 302 can be configured to implement any known machine learning (ML) based devices, any known artificial intelligence (AI) based devices, and any known artificial neural networks, including a convolutional neural network (CNN).

The memory 304 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 302 can be stored in a memory internal to the processor 302. The code can be instructions implemented in hardware. Alternatively, the code can be instructions implemented in software. The instructions can be machine-language instructions executable by the processor 302 to cause the computing device 300 to perform the functions of the computing device 300 described herein. Alternatively, the instructions can include script instructions executable by a script interpreter configured to cause the processor 302 and computing device 300 to execute the instructions specified in the script instructions. In another alternative implementation, the instructions are executable by the processor 302 to cause the computing device 300 to execute an artificial neural network. The processor 302 can be implemented using hardware or software, such as the code. The processor 302 can implement a system, a sub-system, or a module, as described herein.

The memory 304 can store data in any known format, such as databases, data structures, data lakes, or network parameters of a neural network. The data can be stored in a table, a flat file, data in a filesystem, a heap file, a B+ tree, a hash table, or a hash bucket. The memory 304 can be implemented by any known memory, including random access memory (RAM), cache memory, register memory, or any other known memory device configured to store instructions or data for rapid access by the processor 302, including storage of instructions during execution.

The communication interface 306 can be any known device configured to perform the communication interface functions of the computing device 300 described herein. The communication interface 306 can implement wired communication between the computing device 300 and another entity. Alternatively, the communication interface 306 can implement wireless communication between the computing device 300 and another entity. The communication interface 306 can be implemented by an Ethernet, Wi-Fi, Bluetooth, or USB interface. The communication interface 306 can transmit and receive data over a network and to other devices using any known communication link or communication protocol.

The user interface 308 can be any known device configured to perform user input and output functions. The user interface 308 can be configured to receive an input from a user. Alternatively, the user interface 308 can be configured to output information to the user. The user interface 308 can be a computer monitor, a television, a loudspeaker, a computer speaker, or any other known device operatively connected to the computing device 300 and configured to output information to the user. A user input can be received through the user interface 308 implementing a keyboard, a mouse, or any other known device operatively connected to the computing device 300 to input information from the user. Alternatively, the user interface 308 can be implemented by any known touchscreen. The computing device 300 can include a server, a personal computer, a laptop, a smartphone, or a tablet.

Figure 4:
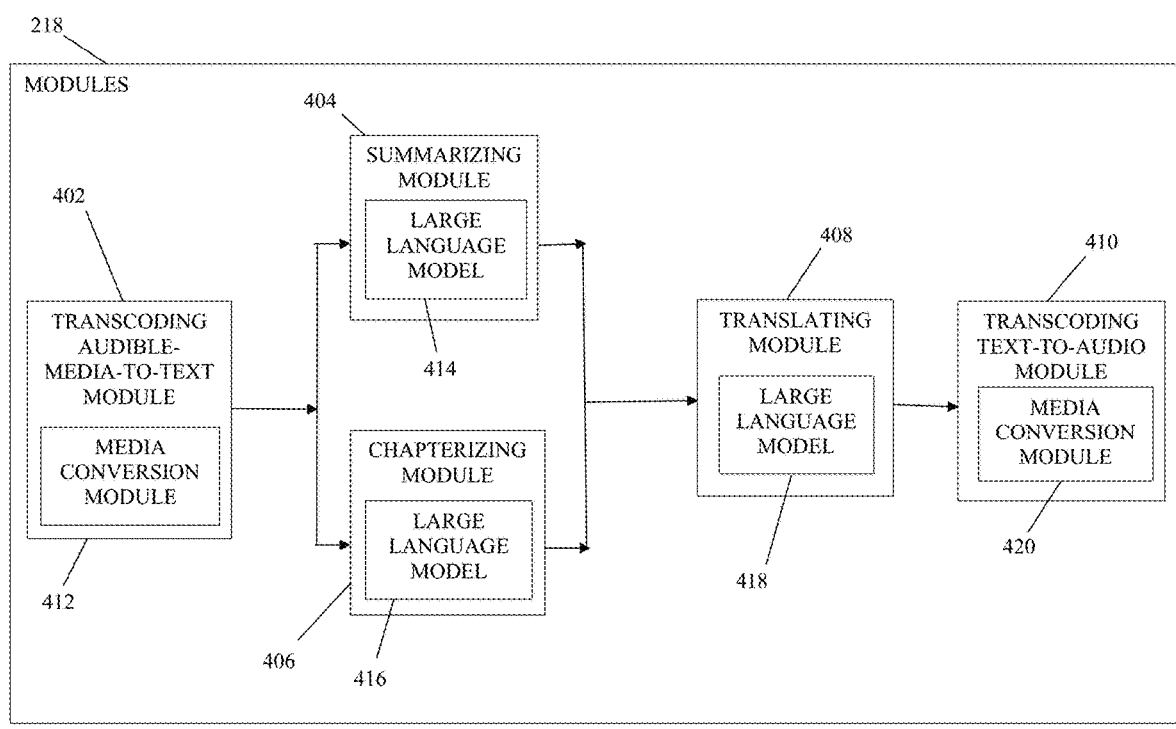
FIG. 4 is a schematic of modules used in the implementation of FIG. 2.

Referring to FIG. 4, in an implementation consistent with the invention, the modules 218 include a transcoding audible-media-to-text module 402, a summarizing module 404, a chapterizing module 406, a translating module 408, and a transcoding text-to-audio module 410. In one implementation, the transcoding audible-media-to-text module 402 includes a media conversion module 412 and is configured to perform format shifting by converting stand-alone audio or video-based audio of the audio/video media 204 to text in a predetermined language such as English. In another implementation, the transcoding audible-media-to-text module 402 includes a known automatic speech recognition (ASR) application or service and is configured to perform format shifting by converting stand-alone audio or video-based audio of the audio/video media 204 to text in a predetermined language such as English.

The summarizing module 404 includes a large language model (LLM) 414 and is configured to create a new and relatively short summary or synopsis in a predetermined language, such as English, based on the text generated from the audio/video media 204 by the transcoding audible-media-to-text module 402. In one implementation, the size of the summary is measured by a predetermined word count. For example, the predetermined word count is set to a default of one-hundred words. In another example, a system administrator sets or changes the predetermined word count by inputting a desired word count using the input/output device 216. The predetermined word count is stored in the memory 212.

In one implementation, the chapterizing module 406 includes a large language model 416 and is configured to identify or generate chapter headings for new chapters or sub-topics as strings of characters forming phrases or sentences, with each chapter heading based on a respective portion of the text as a transcript generated from the audio/video media 204 by the transcoding audible-media-to-text module 402. For example, the chapters or sub-topics are in a predetermined language, such as English. In another implementation, the chapterization module 406 generates, for each chapter identified, a chapter number or index, a chapter start time index, a chapter length, a chapter title, a short chapter summary, a time-indexed sequence of transcript excerpts, and a line-by-line walkthrough of the part of the transcript covered by each chapter.

Figure 8:
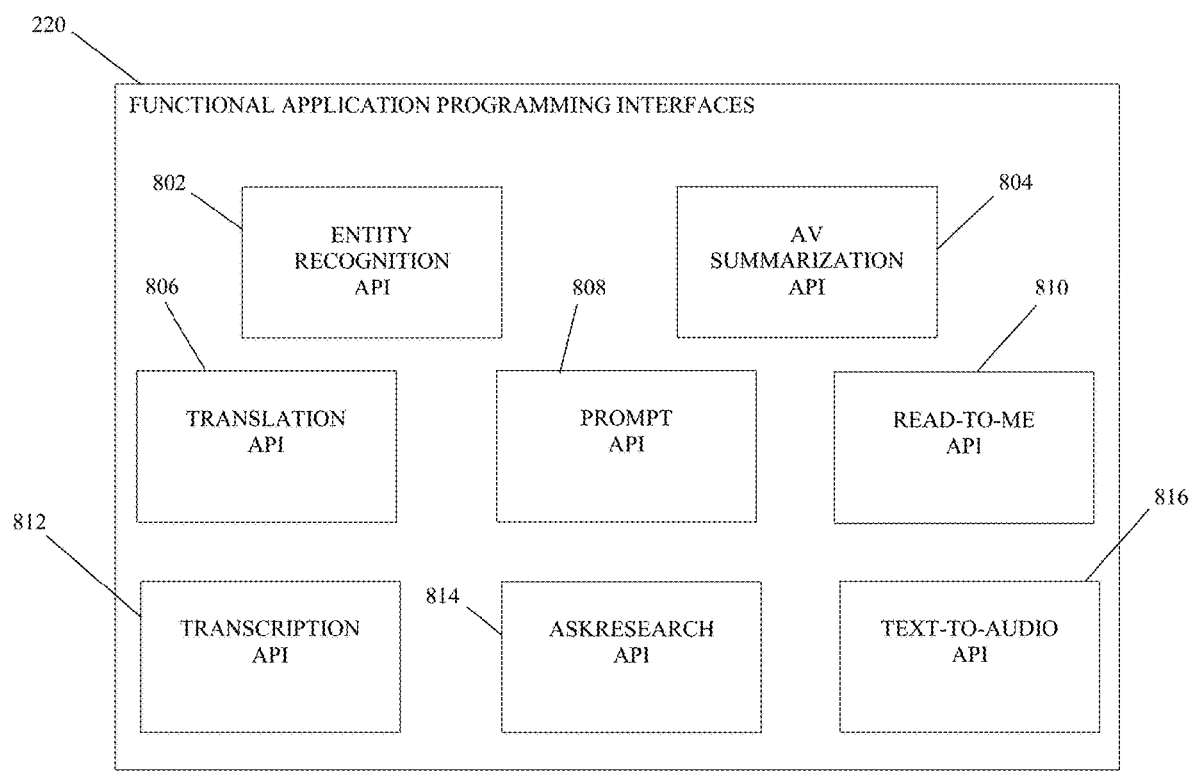
FIG. 8 is a schematic of a plurality of functional application programming interfaces.

The translating module 408 includes a large language model 418 and is configured to perform language shifting of the summary and the chapters or sub-topics, generated by the summarizing module 404 and the chapterizing module 406, respectively. The language shifting converts the summary and the chapters or sub-topics from the predetermined language to a second language; for example, from English to Japanese, to generate a translation of the summary and the chapters or sub-topics into the second language. In one implementation, the second language is a default language setting. In another implementation, a system administrator sets or changes the second language by inputting a second language setting using the input/output device 216. The second language setting is stored in the memory 212. In a further implementation, as shown in FIG. 8 and described in greater detail below, a user selects the second language for the language shifting using the input/output device 216. In an additional implementation, the translating module 408 is optional, and so the audio/video enhancement system 202 conveys an untranslated summary and chapters or sub-topics to the transcoding text-to-audio module 410.

In one implementation, the transcoding text-to-audio module 410 includes a media conversion module 420 and is configured to perform format shifting by converting the summary and chapters or sub-topics, whether translated or not, to audio. In one implementation, the generated audio is in a predetermined language, such as English. In another implementation, the generated audio includes sound effects not limited to a predetermined language. For example, the original audio/video media 204 includes non-language sounds such as nature sounds, explosions, or crashes, as well as onomatopoeia-type sounds such as animal sounds, which the transcoding audible-media-to-text module 402 converts to text-based instructions, such as "leaves rustling", "waves crashing", and "dog barking", which are placed in the generated summary, chapters, or sub-topics. The transcoding text-to-audio module 410 is configured to covert such text-based instructions to corresponding audio. In a further implementation, the generated audio is speech in the predetermined language. In still another implementation, the transcoding text-to-audio module 410 is also optional, and the audio/video enhancement system 202 generates the summary and the chapters or sub-topics without generating a translation of the summary and the chapters or sub-topics to another language, and without generating audio corresponding to the summary and the chapters or sub-topics.

In an implementation consistent with the invention, the audio/video enhancement system 202 has set English as the predetermined language, using an ISO 639-1 based code "EN" stored in the memory 212. However, it is understood that, in other implementations, any known human language is the predetermined language, such as Spanish, Japanese, or Chinese, using ISO 639-1 based codes "ES", "JA", and "ZH", respectively, stored in the memory 212. In another implementation, different codes for languages are used, such as "JP" for Japanese. In addition, In one implementation, the setting of English as the predetermined language is stored as "EN" in the memory 212 as the default predetermined language. In another implementation, a system administrator sets or changes the default predetermined language by inputting a language setting using an ISO 639-1 based code, through the input/output device 216. The set or changed predetermined language setting is stored in the memory 212.

Figure 5:
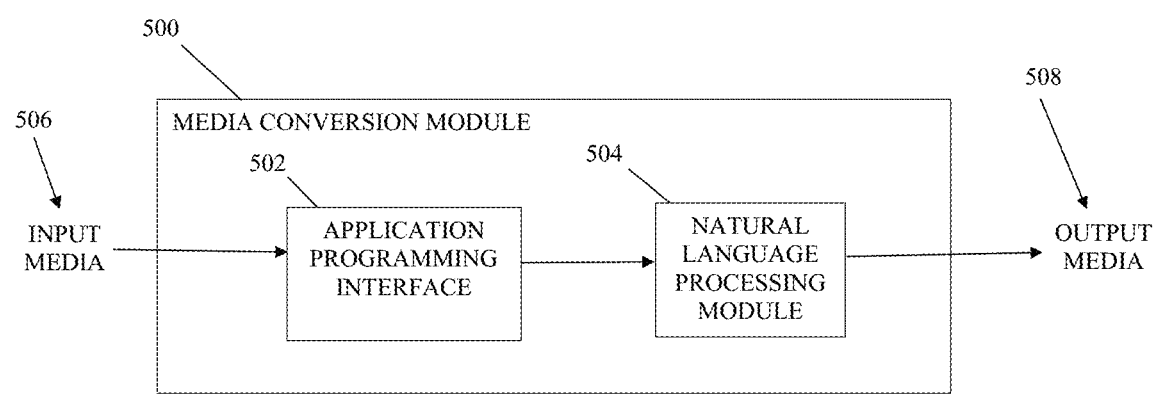
FIG. 5 is a schematic of a media conversion module used in some modules in FIG. 4.

Referring to FIGS. 4-5, the media conversion modules 412, 420, shown in FIG. 4, are implemented by a media conversion module 500 shown in FIG. 5. The media conversion module 500 includes an application programming interface (API) 502 and a natural language processing (NLP) module 504. The media conversion module 500 receives input media 506, formats the input media 506 using the API 502, and the natural language processing module 504 converts the formatted input media 506 to output media 508. In one implementation, the input media 506 is stand-alone audio or video-based audio of the audio/video media 204 provided to the transcoding audible-media-to-text module 402. The media conversion module 500 generates text in a predetermined language, such as English, as the output media 508 corresponding to the stand-alone audio or video-based audio of the audio/video media 204, which is output by the transcoding audible-media-to-text module 402.

In another implementation, the input media 506 is the translated or untranslated summary and chapters or sub-topics provided to the transcoding text-to-audio module 410. The media conversion module 500 generates audio in a predetermined language, such as English, as the output media 508 corresponding to the summary and chapters or sub-topics. The generated audio is output by the transcoding text-to-audio module 410.

In one implementation, the media conversion module 500 shown in FIG. 5 is the AZURE COGNITIVE SERVICES, publicly available from MICROSOFT CORPORATION, including a set of cloud-based APIs that used in AI applications and data flows. The AZURE COGNITIVE SERVICES provides pretrained models implementing at least the natural language processing module 504, that are ready to use in media-processing applications, requiring no additional data and no additional model training. The AZURE COGNITIVE SERVICES utilize known deep learning algorithms, and are accessed by Hypertext Transfer Protocol (HTTP) based representational state transfer (REST) interfaces. In addition, software development kits (SDKs) for the AZURE COGNITIVE SERVICES are publicly available for known application development frameworks. Such functions of the AZURE COGNITIVE SERVICES are described in U.S. Pat. No. 11,914,644 B2, which is incorporated herein by reference.

Figure 6:
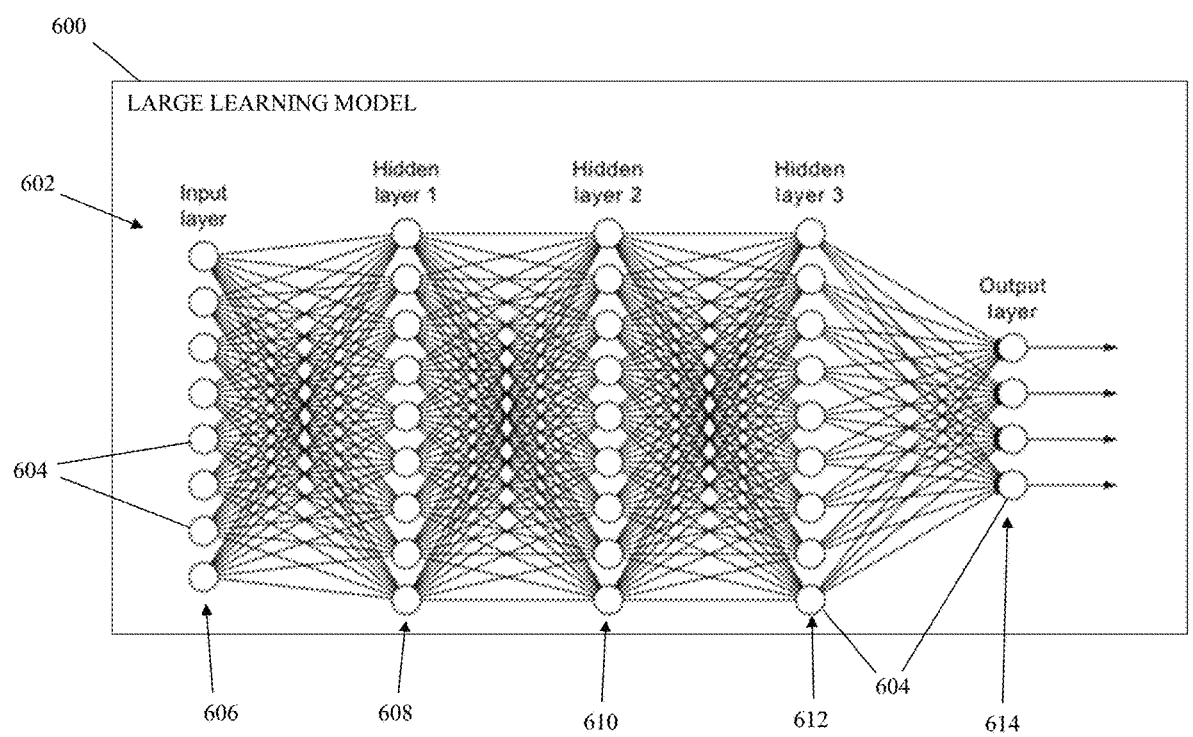
FIG. 6 is a schematic of a large learning model used in other modules in FIG. 4.
Figure 7:
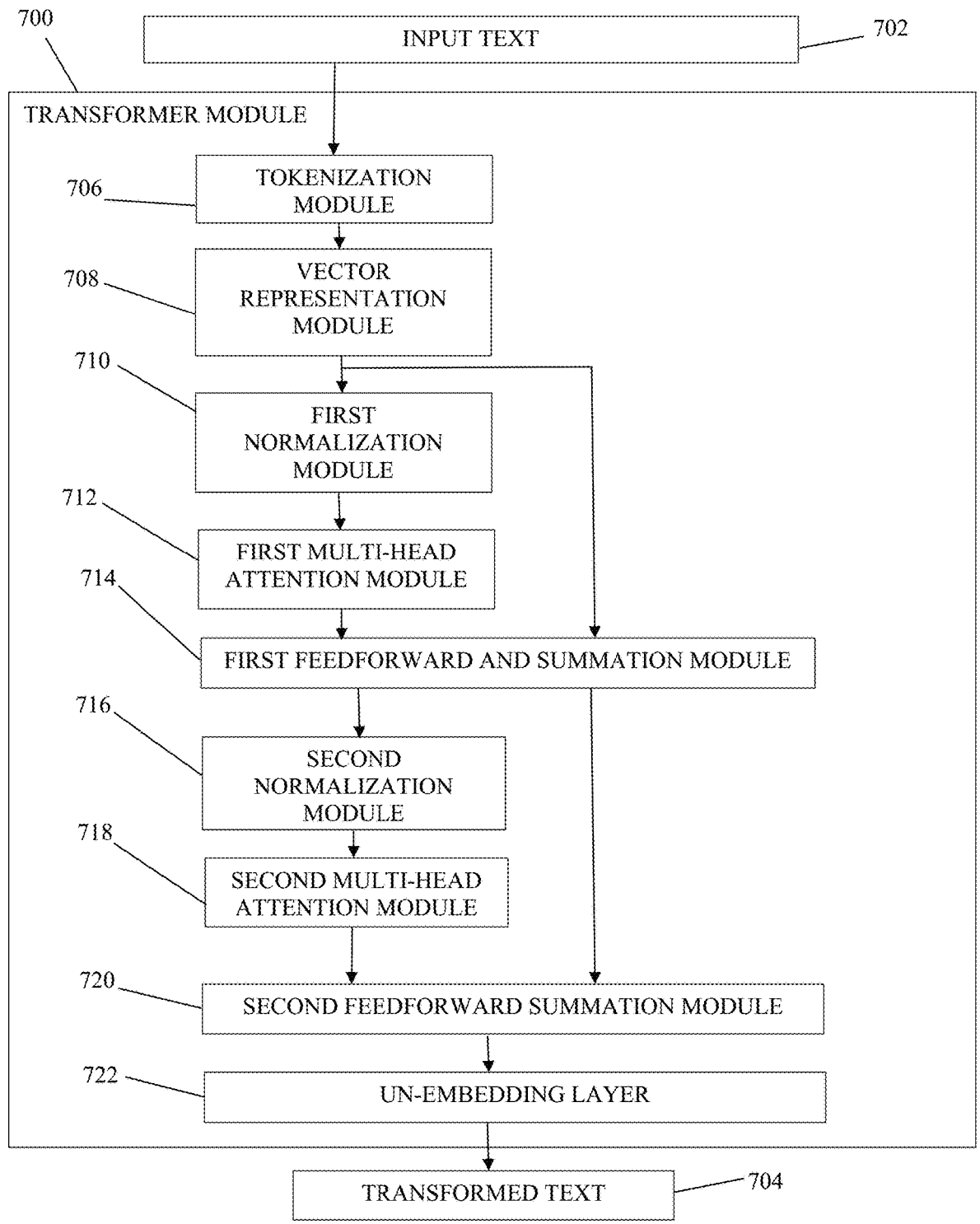
FIG. 7 is a schematic of a transformer module implemented by the large learning model in FIG. 6.

Referring to FIGS. 4 and 6-7, the large language models 414, 416, 418 of the summarizing module 404, the chapterizing module 406, and the translating module 408, respectively, are implemented using the large learning model (LLM) 600 shown in FIG. 6 having a neural network 602 utilizing a transformer architecture such as the transformer module 700 shown in FIG. 7. In one implementation, the large learning model 600 is the GENERATIVE PRETRAINED TRANSFORMER 4 (GPT-4) publicly available from OPENAI, INC.

As shown in FIG. 6, the neural network 602 includes a plurality of nodes or artificial neurons 604 arranged in a plurality of layers 606, 608, 610, 612, 614. The layer 606 is an input layer, and the layer 614 is an output layer, with the layers 608, 610, 612 being at least one hidden layer between input layer 606 and the output layer 614. In an implementation consistent with the invention, the neural network 602 implementing the transformer module 700 shown in FIG. 7 is an N layer transformer model with a hidden layer size of H layers, in which N and H are integers greater than or equal to one. In one implementation, the values of N and H are predetermined values. In another implementation, the values of N and H are set or changed by a system administrator by inputting desired values N and H using the input/output device 216 to configure the transformer model to have N overall layers, and to configure hidden layers of the transformer model to have H hidden layers. The values of N and H are stored in the memory 212.

Referring to FIG. 7, each transformer module 700 of the summarizing module 404, the chapterizing module 406, and the translating module 408 of the large language models 414, 416, 418, respectively, in FIG. 4 receives input text 702 and generates transformed text 704. For the summarizing module 404, the input text 702 is the generated text from the transcoding audible-media-to-text module 402 corresponding to the converted stand-alone audio or video-based audio of the audio/video media 204. For the summarizing module 404, the transformed text 704 is the generated summary.

For the chapterizing module 406, the input text 702 is the generated text from the transcoding audible-media-to-text module 402 corresponding to the converted stand-alone audio or video-based audio of the audio/video media 204. For the chapterizing module 406, the transformed text 704 are the generated chapters or sub-topics. For the translating module 408, the input text 702 are the summary and the chapters or sub-topics. For the translating module 408, the transformed text 704 is the translation of the summary and the chapters or sub-topics from predetermined language to the second language.

In an implementation, as shown in FIG. 7, the transformer module 700 includes a tokenization module 706, a vector representation module 708, a first normalization module 710, a first multi-head attention module 712, a first feedforward and summation module 714, at least a second normalization module 716, at least a second multi-head attention module 718, at least a second feedforward and summation module 720, and an un-embedding layer 722. The tokenization module 706 generates tokens corresponding to the input text 702. The vector representation module 708 acts as an embedding layer, which converts the tokens and positions of the tokens into vector representations as vectorized chunks of the input text 702. The vector representations are stored in the vector embedding database 226 in the memory 212 in FIG. 2. Multiple sets of the components 710-720 are chained to carry out repeated transformations on the vector representations, extracting more and more linguistic information, using alternating attention and feedforward layers.

The final transformed vector representations are converted by the un-embedding layer 722 back to a probability distribution over the tokens to generate the transformed text 704.

Referring to FIGS. 2 and 8, the functional application programming interfaces 220 are accessed by the processor 210 to activate each of the modules 218 shown in FIG. 4, and to perform other operations of the audio/video enhancement system 202. In one implementation, the functional application programming interfaces 220 are stored in a memory of the processor 210. In another implementation, the functional application programming interfaces 220 are stored in the memory 212 and accessed by the processor 210. In an implementation, each of the APIs 802-816 is a RESTful application which adheres to known REST architectural constraints. In another implementation, each of the APIs 802-816 is a RESTful HTTP-based API which is compliant with known best practices regarding the "verbs" or HTTP methods to which a resource responds.

In one implementation, the Entity Recognition API 802 extracts data from the audio/video media 204 such as information regarding entities referred to in the audio/video media 204. For example, the entities include a company or organization name, names of industries, names of significant people, coverage teams, concepts, and themes. In another implementation, the Entity Recognition API 802 reads a transcript generated from the audio/video media 204 by the transcoding audible-media-to-text module 402 and identifies entities for use by the AskResearch API 814 to access a separate research service.

In one implementation, the AV Summarization API 804 initiates the functions of the summarizing module 404 and the chapterizing module 406 to generate the summary and the chapters or sub-topics, respectively. In another implementation, the AV Summarization API 804 activates the Prompt API 808 to fetch a summarizing prompt or to fetch a chapterizing prompt from the prompt database 212. The summarizing prompt and the chapterizing prompt include instructions which are used by the large language models 414, 416, respectively, to generate the summary and the chapters or sub-topics, respectively.

In one implementation, the Translation API 806 initiates the function of the translating module 408 to translate the original language of the audio/video media 204 to a second language. In another implementation, the Translation API 806 activates the Prompt API 808 to fetch a translation prompt from the prompt database 212. The translation prompt include instructions which are used by the large language model 418 to generate the translation of the original language into the second language.

In one implementation, the Read-to-Me API 810 initiates a Read-to-Me function upon activation by a GUI control described in greater detail below with reference to FIG. 9. In another implementation, the Read-to-Me API 810 activates a text-to-audio API 816 to perform a predetermined text-to-audio service, such as a known text-to-speech application.

In one implementation, the Transcription API 812 initiates the function of the transcoding audible-media-to-text module 402 to generate corresponding text, as described above. For example, the Transcription API 812 activates a known ASR application or service to generate the corresponding text of the audio/video media 204.

Figure 9:
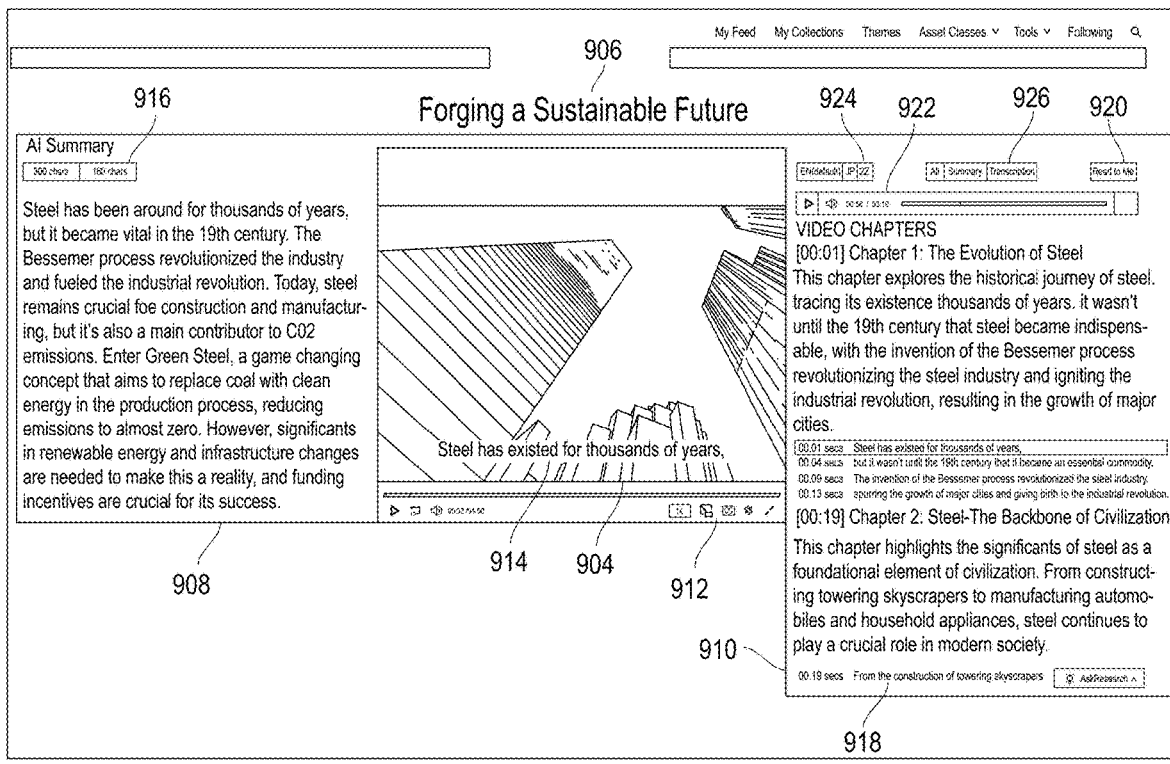
FIG. 9 is a graphic user interface displaying video with interactive controls.

As shown in FIG. 9, the input/output device 216 executes an interactive media player to generate and output a GUI 900 to interactively access and control the enhanced audio/video media 208 generated by the audio/video enhancement system 202 from the audio/video media 204. In one implementation, the interactive media player is provided by a web browser, such as the EDGE web browser publicly available from MICROSOFT CORPORATION, or the CHROME web browser publicly available from GOOGLE LLC. In another implementation, the interactive media player is the JW PLAYER video player software publicly available from LONGTAIL AD SOLUTIONS, INC.

In an implementation consistent with the invention, the GUI 900 includes a tool bar 902, a video player region 904 displaying a video, a title 906 associated with the video playing in the video player region 904, an AI summary region 908, and a chapter region 910. In one implementation, the tool bar 902 includes clickable or actuatable icons or controls for searching for videos by themes or by keyword using the hourglass icon.

In one implementation, the video player region 904 displays the video, which is the original audio/video media 402. In another implementation, the video player region 904 resizes the original audio/video media 402 to fit within a predetermined size of the video player region 904. The video player region 904 includes a video tool bar 912 such as a play icon, an audio volume control icon, a settings icon for setting audio and video playback options, and other known audio and video controls. The video player region 904 also includes a captioning feature 914 activatable by the user using the settings icon to toggle turning on or off captions associated with the audio/video media 402. For example, the captions are closed-captioning of the audio/video media 402.

In one implementation, the title 906 is the title of the original audio/video media 402. In another implementation, the title 906 is a relatively short summary of the audio/video media 402, with the relatively short summary, such as a phrase having a predetermined maximum number of words, generated by the summarizing module 404. The AI summary region 908 displays the automatically generated summary from the summarizing module 404. In one implementation, multiple summaries of the content of the video are displayed, offered at pre-selected lengths so as to be most useful in specific contexts. In an implementation, the AI summary region 908 includes icons 916 allowing a user to set a maximum number of words or characters in the AI summary region 908 as the pre-selected lengths, such as 160 characters and 300 characters.

The chapter region 910 displays the automatically generated chapters or sub-topics from the chapterizing module 406. A chapter breakdown region 918 identifies meaningful chapters or sub-topics as sections of the full content of the transcript generated by the transcoding audible-to-text module 402, captures the time boundaries, and generates illustrative titles and summaries for each of the chapters. Such chapters act as indices which the user uses to navigate based on interests of the user and the time available to the user. The chapters also entice the user to engage with the content, by raising multiple facets of the audio/video media 204 to the surface. By exposing the user to more of the content through the use of chapters, the GUI 900 displaying and playing the enhanced audio/video media 208 leads to productive discovery of ideas not necessarily captured in the AI summary region 908. In an implementation, the chapters are contiguous and sequential. Each identified chapter includes a chapter number, a chapter start time index, a chapter length, a chapter title, a chapter summary, and a line-by-line walkthrough of the part of the transcript covered by each respective chapter.

Each of the elements of the chapters are actuatable by the user through the GUI 900. In one implementation, clicking the chapter number, chapter start time index, or the chapter title automatically resets the playback position of the video within the media player to the beginning of the corresponding chapter. If playback was already in progress at the time of the click, playback resumes at the new position after the click. However, if playback was paused or not yet started at the time of the click, playback remains paused after the click, but at the new position.

For the line-by-line walkthrough feature, each line of the line-by-line walkthrough includes a line start time index and a part of the transcript covered by the line. Clicking any line in the line-by-line walkthrough automatically resets the playback position within the media player to the corresponding point. If playback is already in progress at the time of the click, playback resumes at the new position after the click. However, if playback is paused or not yet started at the time of the click, playback remains paused after the click, but at the new position. As playback proceeds, the individual line within the line-by-line walkthrough is automatically highlighted as those words are spoken, in a "follow along" fashion.

The captioning feature 914 within the media player is synchronized with the line-by-line walkthrough feature of the chapter breakdown. The chapter divisions or tick marks along the progress bar within the control bar of the media player are marked with the corresponding chapter titles. In one implementation, when a user hovers a cursor over the chapter divisions or tick marks, the media player displays the corresponding chapter titles.

As shown in FIG. 9, the chapter region also includes a read-to-me icon 920 for activating a read-to-me feature, a read-to-me audio playback bar 922, language selection icons 924, and summary control selection icons 926. Actuation of the read-to-me icon 922 activates the read-to-me feature, in which audio files or assets are automatically generated from the text transcript of the audio/video media 204. The read-to-me icon 920, when toggled, displays or hides an additional low-profile audio playback bar 922, which includes a play/pause toggle, a volume control, a time index of the current playback position, an expression of the overall length of time of the content, and a progress bar. When playback is engaged for the read-to-me feature, the additional audio playback bar 922 plays the spoken audio in the currently selected language. For example, the read-to-me feature is utilized when a user is unable to read text or view a video, such as when the user is outdoors on a run, when the user is driving a car to avoid the user diverting his/her eyes from the road, or when the user is in an area with poor internet bandwidth, and so audio playback is smoother than video playback.

The language selection icons or controls 924 allow a user to select a language, such as English (EN), Japanese (JP), or Chinese (ZH). By selecting a given language selection icon 924, all of the required text and audio files or assets are automatically generated from the text transcript. In addition, the language selection icons or controls 924 offer settings for each supported language. In one implementation, the audio/video enhancement system 202 uses the original language of the audio/video media 204 as the default language. Upon changing the selected language via the language selection icons or controls 924, the following assets shown in the GUI 900 are changed to the selected language: the summary in the AI summary region 908, the chapter breakdowns and line-by-line walkthroughs in the chapter region 910, the spoken audio output upon selection of the read-to-me feature using the read-to-me icon 920, the captioning 914 within the media player, the chapter titles in the chapter region 910, and various labels and icons or controls displayed in the GUI 900.

Such selection of the language of the enhanced audio/video media 208 using the language selection icons or controls 924 enhances the ability of the user to engage with the content of the audio/video media 204 in a preferred language expression. The selection of the language experienced by the user broadens the potential audience of the audio/video media 204, increasing the likelihood of a positive, productive interaction of the user with the content of the audio/video media 204. In one implementation, the spoken language of the original audio/video media 204 displayed in the video player 904 does not change. In another implementation, the audio/video enhancement system 202 generates a spoken language translated from the original language of the original audio/video media 204 to the language selected by the user with the language selection icons or controls 924.

In one implementation, summary control selection icons 926 allow the user to view all of the generated text such as the summary and the chapters or sub-topics in the summary region 908 and the chapter region 910, to view only the summary region 908 displaying the summary, or to view only a transcription of the original audio/video media 204.

Figure 10A:
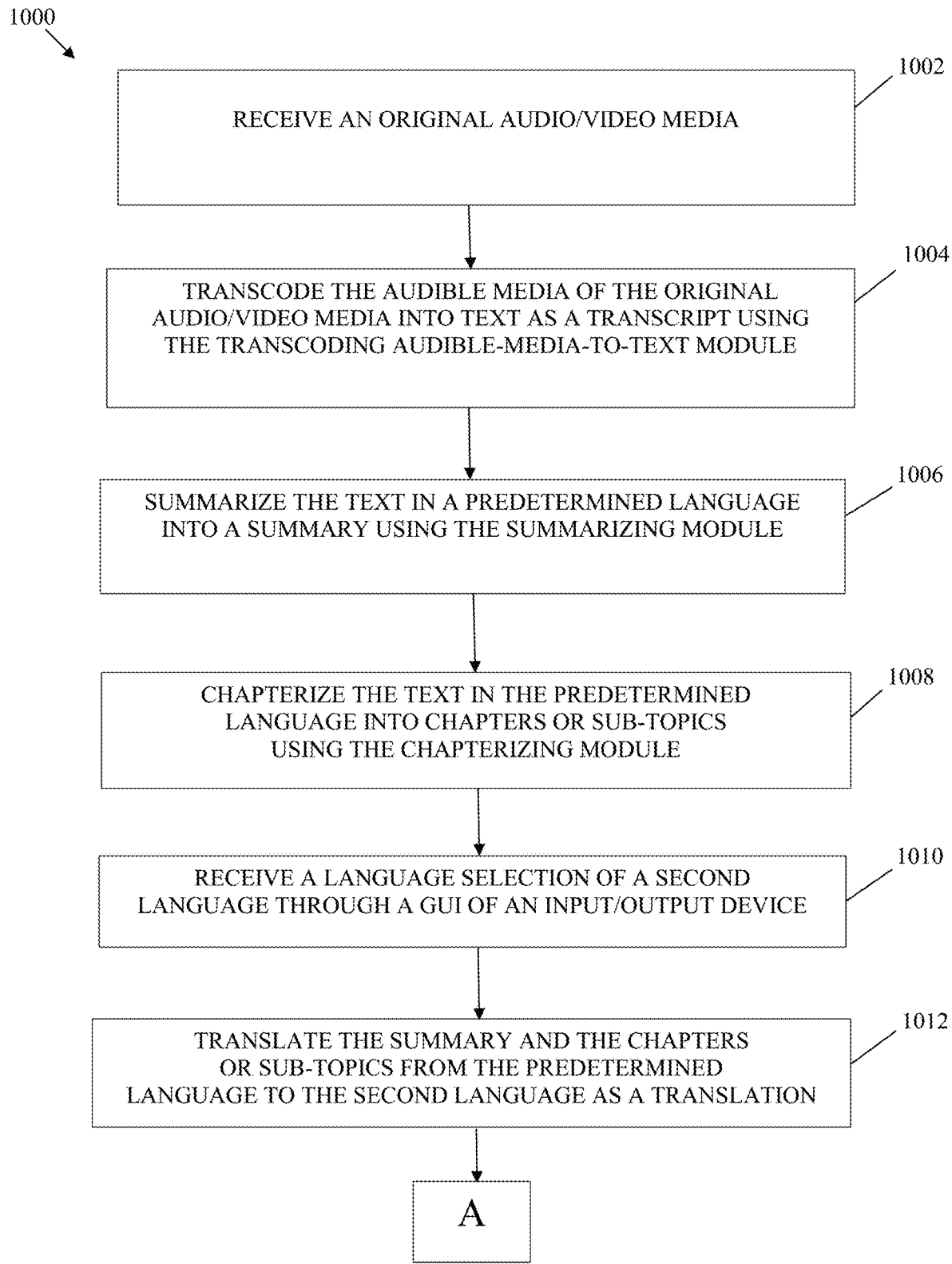
FIGS. 10A-10B are flowcharts of a method of operation of the system of FIG. 2.
Figure 10B:
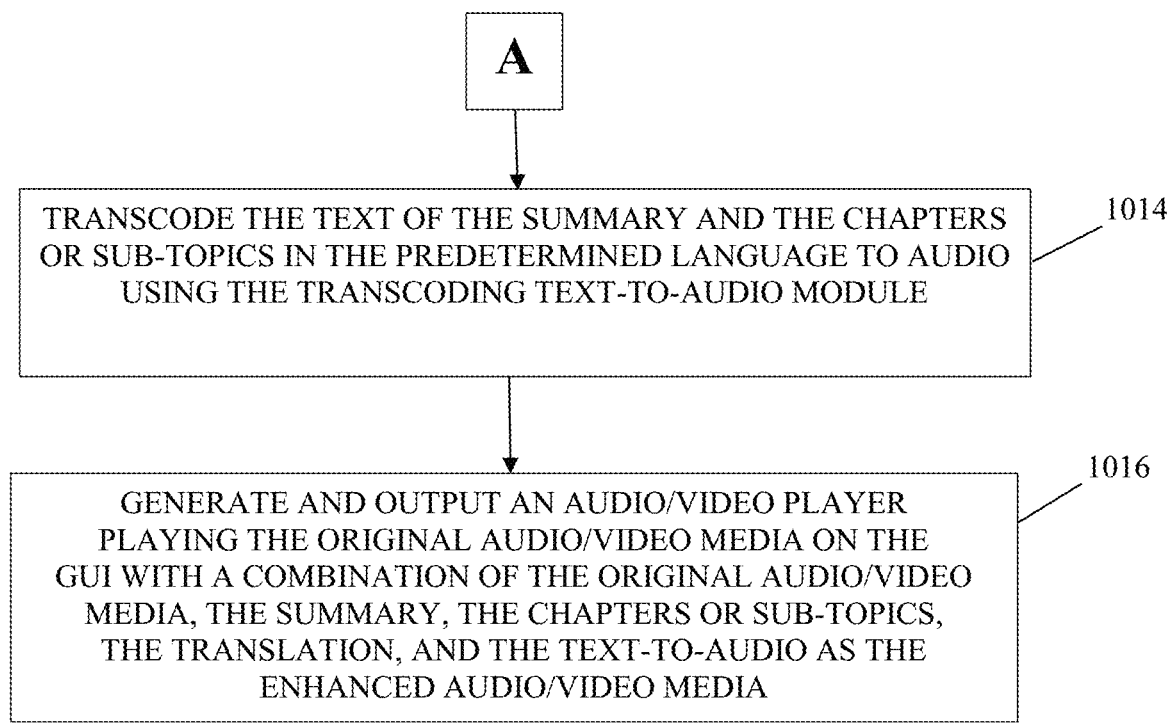

Referring to FIGS. 10A-10B, a computer-based method 1000 includes receiving an original audio/video media 204 in step 1002, transcoding the audible media of the original audio/video media 204 into text as a transcript using the transcoding audible-media-to-text module 402 in step 1004, summarizing the text in a predetermined language into a summary using the summarizing module 404 in step 1006, chapterizing the text in the predetermined language into chapters or sub-topics using the chapterizing module 406 in step 1008, receiving a language selection of a second language through a GUI 900 in step 1010, translating the summary and the chapters or sub-topics from the predetermined language to the second language as a translation in step 1012, and transcoding the text of the summary and the chapters or sub-topics in the predetermined language to audio using the transcoding text-to-audio module 410 in step 1014. The computer-based method 1000 then generates and outputs an audio/video player playing the original audio/video media 204 on the GUI 900 in step 1016, with a combination of the original audio/video media 204, the summary, the chapters or sub-topics, the translation, and the text-to-audio as the enhanced audio/video media.

In an implementation consistent with the invention, a non-transitory computer-readable storage medium stores instructions executable by a processor, such as the processor 210, to generate the enhanced audio/video media 208 from the original audio/video media 204. The instructions include the steps of the method 1000 in FIGS. 10A-10B.

Using the system 200 and method 1000, generative AI techniques are leveraged toward achieving the goal of a better client experience with the enhancements in the enhanced audio/video media 208, providing opportunities to improve a sales pitch or informative experience of audio/video media 204 provided by an organization to a user and to improve the content consumption experience itself. A user such as a client or a potential client is provided with more information about the content of the audio/video media 204 before the user decides to invest valuable time interacting with the audio/video media 204. By enhancing the original audio/video media 204 automatically using generative AI, the user is empowered with more information to guide user along the information journey and to access the material in the most comfortable ways.

In one implementation, the enhanced audio/video media 208 provides chapter elements which are fully navigable, such as by clicking something in the chapter breakdown to jump to the corresponding position in the content in the media player. The chapter breakdowns are integrated with the media player so that the chapter breakdowns are always in-sync, making the chapter breakdowns automatically scroll along with the progress of the media player outputting the enhanced audio/video media 208. The language selector icons and controls 924 allow a user to choose the language of all the text assets presented in and around the media player. The read-to-me feature speaks an audio part of the content in the chosen language, allowing listening in diverse environments, such as in a car or out on a run.

By automating the generation of the enhanced audio/video media 208 using the generative AI techniques, content creators and editors are more efficient and quicker to market with audio/video content. For users, the media content is more discoverable, allowing users to easily figure out what topics are covered within the content, to easily navigate to the parts most interesting to the user, and to read or listen to the media in the native language of the user. In addition, the enhanced audio/video media 208 improves the way in which users such as clients of an organization engage with audio and video content of the organization, which facilitates showcasing of the best ideas of analysts and researchers of the organization who prepare the original audio/video media 204, thus removing friction from the communication process. In turn, by increasing the effectiveness in presenting the best investment ideas of an organization to users such as clients and potential client, the more purchases, trading, and banking business for an organization are encouraged means higher revenue for the organization, which also elevates the standing of the organization with the clients of the organization.

In other implementations, additional features include speaker diarization to partition an audio stream containing human speech into homogeneous segments according to the identity of each speaker, and adding speaker identities to the line-by-line walkthrough part of the chapter breakdown feature. Also, text is scanned for terms and concepts to enable links to navigation and consume content or to see previews in situ, such as smart previews. For example, in a video having the phrase "See our chart in the report", a link to the chart is generated and displayed in the GUI 900. In another implementation, image identification is performed during use of the read-to-me features, to automatically identify important images from within the video and to derive a text description of the images depicted. In addition, a description of images is integrated into the read-to-me feature such that vision impaired users incorporate the visual aspect of the video into the experience of the user with the content of the enhanced audio/video media 208.

In a further implementation, the language selection icons or controls 924 include a selection to perform a translation to a predetermined sign-language for the hearing impaired. For example, such translation involves text-to-video transcoding. In another implementation, language translation is performed to video lipsync, such that the video displayed in the video player region 904 is altered to adapt facial movements of each speaker to correspond with the selected language as the selected language is spoken.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
a media source configured to provide an original media including first audio;
a media enhancement system, including:
a hardware-based processor;
a memory configured to store instructions and configured to provide the instructions to the hardware-based processor;
an input/output device configured to display a graphic user interface (GUI) with a media player; and
a set of modules configured to implement the instructions provided to the hardware-based processor, the set of modules including:
a transcoding media-to-text module, including a first media conversion module, executed by the hardware-based processor to automatically generate text corresponding to the first audio;
a summarizing module, including a first large language model, executed by the hardware-based processor to automatically generate a summary of the generated text; and
a chapterizing module, including a second large language model, executed by the hardware-based processor to automatically generate a plurality of chapter headings with each chapter heading corresponding to a respective portion of the generated text;
wherein the GUI outputs an enhanced media including the original media, the summary, and the plurality of chapter headings, with the media player configured to play the original media to a user,
wherein the GUI includes a display region displaying the summary and the plurality of chapter headings to the user,
wherein the original media is in a first language,
wherein the transcoding media-to-text module is executed by the hardware-based processor to generate the generated text in the first language,
wherein the GUI is configured to receive a language selection selectable from at least one second language from the user, and
wherein the set of modules includes:
a translating module, including a third large language model, executed by the hardware-based processor to automatically convert the generated text in the first language to a translated text in the language selection,
the summarizing module executed by the hardware-based processor to automatically generate a summary of the translated text, and
the chapterizing module executed by the hardware-based processor to automatically generate a plurality of chapter headings of the translated text.

2. The system of claim 1, wherein the original media includes video incorporating the first audio.

3. The system of claim 1, wherein each of the summarizing module, the chapterizing module, and the translating module includes a neural network configured as a transformer to implement the first, second, and third large language models, respectively.

4. The system of claim 1, wherein the set of modules includes: a transcoding text-to-audio module, including a second media conversion module, executed by the hardware-based processor to automatically generate a second audio from the generated text.

5. The system of claim 4, wherein each of transcoding media-to-text module and the transcoding text-to-audio module includes a natural language processing module executed by the hardware-based processor to perform natural language processing on the original media and on the generated text, respectively, to implement the first and second media conversion modules, respectively.

6. The system of claim 1, wherein the GUI includes a control, responsive to a user selection, and executed by the hardware-based processor to control the media player to play the original media to the user, to control the displaying of the summary to the user, or to control the display of the plurality of chapter headings to the user.

7. A media enhancement system, responsive to an original media including first audio, comprising:
a hardware-based processor;
a memory configured to store instructions and configured to provide the instructions to the hardware-based processor;
an input/output device configured to display a graphic user interface (GUI) with a media player; and
a set of modules configured to implement the instructions provided to the hardware-based processor, the set of modules including:
a transcoding media-to-text module, including a first media conversion module, executed by the hardware-based processor to automatically generate text corresponding to the first audio;
a summarizing module, including a first large language model, executed by the hardware-based processor to automatically generate a summary of the generated text; and
a chapterizing module, including a second large language model, executed by the hardware-based processor to automatically generate a plurality of chapter headings with each chapter heading corresponding to a respective portion of the generated text;
wherein the GUI outputs an enhanced media including the original media, the summary, and the plurality of chapter headings, with the media player configured to play the original media to a user,
wherein the GUI includes a display region displaying the summary and the plurality of chapter headings to the user,
wherein the original media is in a first language,
wherein the transcoding media-to-text module is executed by the hardware-based processor to generate the generated text in the first language,
wherein the GUI is configured to receive a language selection selectable from at least one second language from the user, and
wherein the set of modules includes:
a translating module, including a third large language model, executed by the hardware-based processor to automatically convert the generated text in the first language to a translated text in the language selection,
the summarizing module executed by the hardware-based processor to automatically generate a summary of the translated text, and
the chapterizing module executed by the hardware-based processor to automatically generate a plurality of chapter headings of the translated text.

8. The enhancement system of claim 7, wherein the original media includes video incorporating the first audio.

9. The enhancement system of claim 7, wherein each of the summarizing module, the chapterizing module, and the translating module includes a neural network configured as a transformer to implement the first, second, and third large language models, respectively.

10. The enhancement system of claim 7, wherein the set of modules includes: a transcoding text-to-audio module, including a second media conversion module, executed by the hardware-based processor to automatically generate a second audio from the generated text.

11. The enhancement system of claim 10, wherein each of transcoding media-to-text module and the transcoding text-to-audio module includes a natural language processing module executed by the hardware-based processor to perform natural language processing on the original media and on the generated text, respectively, to implement the first and second media conversion modules, respectively.

12. The enhancement system of claim 7, wherein the GUI includes a control, responsive to a user selection, and executed by the hardware-based processor to control the media player to play the original media to the user, to control the displaying of the summary to the user, or to control the display of the plurality of chapter headings to the user.

13. A computer-based method executed by a hardware-based processor, comprising:
  receiving an original media including first audio;
  displaying a graphic user interface (GUI) with a media player and a display region on an input/output device;
  automatically transcoding the first audio of the original media into text using a transcoding media-to-text module, including a first media conversion module;
  automatically summarizing the text in a first language into a summary using a summarizing module, including a first large language model;
  automatically chapterizing the text in the first language into a plurality of chapter headings using a chapterizing module, including a second large language model;
  outputting, through the GUI, an enhanced media including the original media, the summary, and the plurality of chapter headings, with the media player configured to play the original media to a user;
  displaying, through the GUI, the summary and the plurality of chapter headings in the display region to the user;
  providing a translating module, including a third large language model, wherein the original media is in the first language, wherein the transcoding media-to-text module is executed by the hardware-based processor to generate the generated text in the first language, and wherein the GUI is configured to receive a language selection selectable from at least one second language from the user;
  automatically converting the generated text in the first language to a translated text in the language selection using the translating module;
  automatically generating a summary of the translated text using the summarizing module; and
  automatically generating a plurality of chapter headings of the translated text using the chapterizing module.

14. The computer-based method of claim 13, wherein the original media includes video incorporating the first audio.

15. The computer-based method of claim 13, wherein each of the summarizing module, the chapterizing module, and the translating module includes a neural network configured as a transformer to implement the first, second, and third large language models, respectively.

16. The computer-based method of claim 13, further comprising:
  providing a transcoding text-to-audio module, including a second media conversion module; and
  automatically generating a second audio from the generated text.

17. The computer-based method of claim 16, wherein each of transcoding media-to-text module and the transcoding text-to-audio module includes a natural language processing module executed by the hardware-based processor to perform natural language processing on the original media and on the generated text, respectively, to implement the first and second media conversion modules, respectively.

* * * * *